United States Patent
Ellis

(10) Patent No.: US 8,136,182 B2
(45) Date of Patent: Mar. 20, 2012

(54) AIR MATTRESS ASSEMBLY

(76) Inventor: John M. Ellis, Mansfield, OH (US)

(*) Notice: Subject to any disclaimer, the term of this patent is extended or adjusted under 35 U.S.C. 154(b) by 862 days.

(21) Appl. No.: 12/174,057

(22) Filed: Jul. 16, 2008

(65) Prior Publication Data

US 2009/0019638 A1    Jan. 22, 2009

Related U.S. Application Data

(60) Provisional application No. 60/959,502, filed on Jul. 16, 2007.

(51) Int. Cl.
*A47C 27/08* (2006.01)

(52) U.S. Cl. .................................. 5/118; 5/706; 5/902

(58) Field of Classification Search ............... 5/118–119, 5/417, 420, 706, 902
See application file for complete search history.

(56) References Cited

U.S. PATENT DOCUMENTS

| | | | |
|---|---|---|---|
| D310,343 S | 9/1990 | Angerer | |
| 5,966,755 A | 10/1999 | Pittman | |
| 6,042,186 A * | 3/2000 | Kojic et al. | 297/452.41 |
| 6,886,204 B2 * | 5/2005 | Kasatshko et al. | 5/722 |
| 7,021,694 B1 | 4/2006 | Roberts et al. | |
| 2001/0052153 A1 * | 12/2001 | Schwartz et al. | 5/905 |
| 2002/0083528 A1 | 7/2002 | Fisher et al. | |
| 2005/0099054 A1 | 5/2005 | McCarthy et al. | |
| 2005/0120477 A1 | 6/2005 | Kennan | |
| 2007/0107134 A1 * | 5/2007 | Pittman | 5/713 |

* cited by examiner

*Primary Examiner* — Fredrick Conley
(74) *Attorney, Agent, or Firm* — Fay Sharpe LLP

(57) ABSTRACT

An inflatable air mattress assembly for use with a vehicle is provided. The vehicle includes a bed having protruding wheel well compartments, opposed sidewalls, a tailgate and a headboard. The air mattress assembly comprises and inflatable base, an inflatable first support and an inflatable second support. The inflatable base includes a top surface and a bottom surface. The base has lateral recesses formed therein which extend from the bottom surface towards the top surface and define a ledge over the recesses. The base is dimensioned and configured for placement in the vehicle bed with the recesses being disposed over the wheel well compartments protruding into the bed. A front portion of the base is adjacent the headboard. A rear portion of the base is adjacent a tailgate. The inflatable first support is releasable attached to the front portion of the base. The first support includes an inflatable backrest and at least one inflatable armrest connected to the backrest. The inflatable second support is releasably attached to one of the front portion of the base and the first support. The second support is spaced from the at least one armrest.

17 Claims, 14 Drawing Sheets

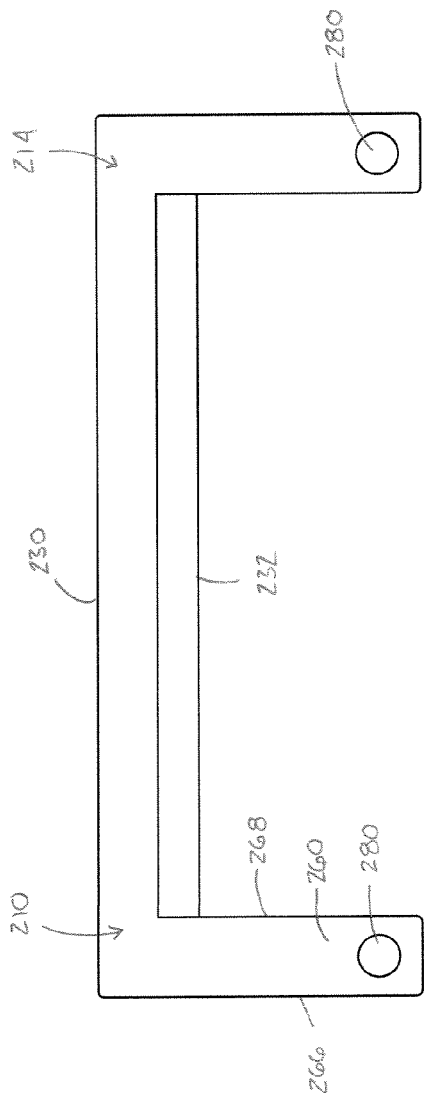
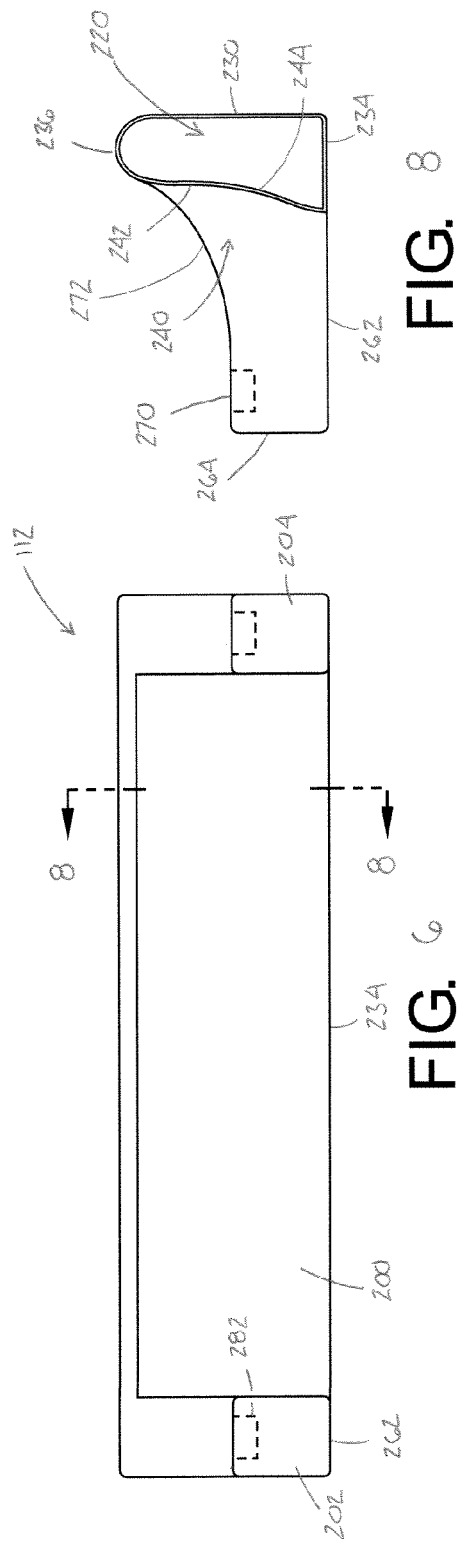

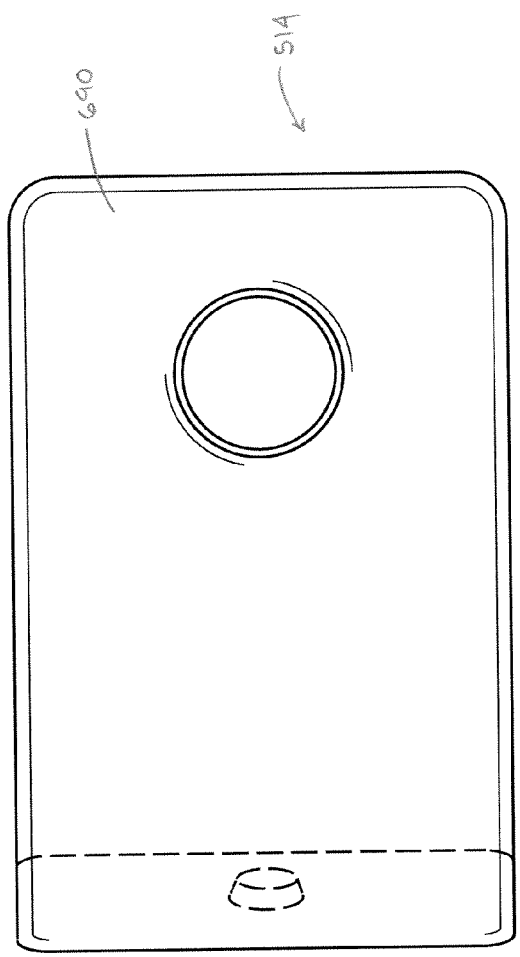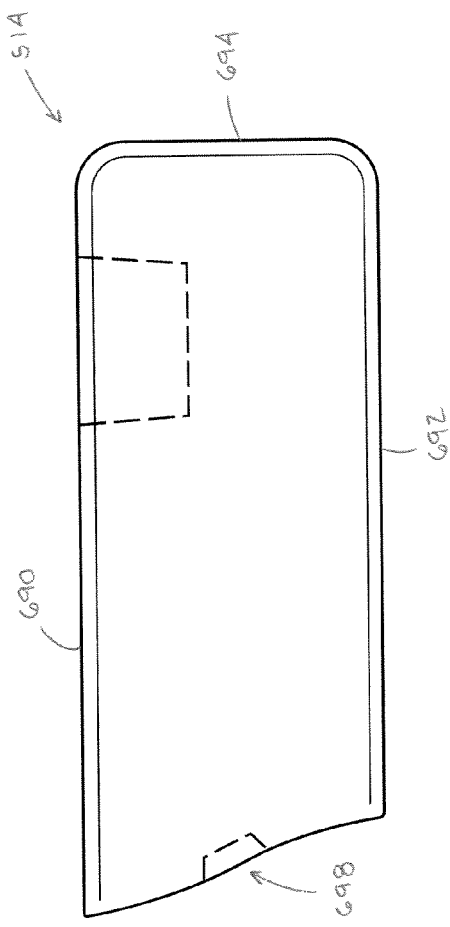
FIG. 18
FIG. 19

AIR MATTRESS ASSEMBLY

CROSS REFERENCE TO RELATED APPLICATIONS

This application claims priority from U.S. Provisional Patent Application Ser. No. 60/959,502, filed 16 Jul. 2007, the disclosure of which is incorporated herein by reference.

BACKGROUND

The present disclosure generally relates to an air mattress assembly. More particularly, the present disclosure is directed to an air mattress assembly for use with a pickup truck, van, sports utility vehicle (SUV), station wagon and the like.

Certain types of vehicles such as pickup trucks, vans, SUVs and station wagons have flatbeds or beds that are normally used to carry cargo or the like. Flatbeds or beds, which are open containers formed within the structure of the vehicle for carrying cargo, generally contain cumbersome protruding wheel well compartments that can greatly impinge on the size and shape of the cargo that can fit in the flatbed. Furthermore, when such vehicles are changed over and utilized for the transportation of passengers, or used as sleeping quarters in the course of a trip requiring a prolonged or overnight stay, the transformation of the flatbed from a working storage area to a comfortable sleeping or reclining quarters can be problematic and uncomfortable at best. When attempting to accommodate passengers whom desire to use this converted space, the protruding wheel well compartments represent an inherent problem by getting in the way of and diminishing what limited comfort various types of coverings and padding, such as a conventional mattress, unable to fit around the wheel wells, can provide. Another inherent problem in this type of changeover is that flatbeds are frequently dirtied by use, are hard and uncomfortable.

Attempts have been made to use various cloth and/or plastic coverings for flatbeds but these solutions usually move or easily slide about, are unable to appropriately accommodate the protruding wheel well compartments and simply do not supply enough comfort for the flatbed. It would be desirable to provide an air mattress assembly specifically shaped and designed for the vehicle flatbed, allowing the user to comfortably use the air mattress assembly, despite the presence of the uncomfortable and intrusive wheel well compartments.

BRIEF DESCRIPTION

In accordance with one aspect, an inflatable air mattress assembly for use with a vehicle is provided. The vehicle includes a bed having protruding wheel well compartments, opposed sidewalls, a tailgate and a headboard. The air mattress assembly comprises an inflatable base, an inflatable first support and an inflatable second support. The inflatable base includes a top surface and a bottom surface. The base has lateral recesses formed therein which extend from the bottom surface towards the top surface and define a ledge over the recesses. The base is dimensioned and configured for placement in the vehicle bed with the recesses being disposed over the wheel well compartments protruding into the bed. A front portion of the base is adjacent the headboard. A rear portion of the base is adjacent a tailgate. The inflatable first support is releasable attached to the front portion of the base. The first support includes an inflatable backrest and at least one inflatable armrest connected to the backrest. The inflatable second support is releasably attached to one of the front portion of the base and the first support. The second support is spaced from the at least one armrest.

In accordance with another aspect, an air mattress assembly for a pickup truck comprises an inflatable base, an inflatable first support and an inflatable second support. The inflatable base is configured for placement in a pickup bed. The base covers the substantially entire bed including wheel well compartments protruding therein. The inflatable first support is removably attached to the front portion of the base. The first support has a width approximately equal to a width of the base. The first support includes an inflatable backrest and first and second inflatable armrests. Each of the backrest and the first and second armrests define an air chamber. At least one of the first and second armrests includes a cup holder. The inflatable second support is removably attached to one of the first support and the base. The second support is positionable along the width of the first support and serves as an additional armrest.

In accordance with yet another aspect, an air mattress assembly for a pickup truck comprises an inflatable base, an inflatable first support and an inflatable second support. The inflatable base is dimensioned and configured for placement in a pickup bed. The base covers the substantially entire bed including wheel well compartments. The base includes a first member and a second member releasably connected to the first member. At least one of the first and second members is formed from a first inflatable component and a second inflatable component. One of the first and second components has a lateral recess formed therein. The recess is disposed over a wheel well compartment protruding into the bed. The inflatable first support is removably attached to the front portion of the base. The first support includes an inflatable backrest and first and second inflatable armrests. At least one of the first and second armrests includes a cup holder. The inflatable second support is removably attached to one of the first support and the base. The second support provides an additional armrest.

BRIEF DESCRIPTION OF THE DRAWINGS

FIG. 6 is a front elevational view of a first support of the air mattress assembly of FIG. 1.

FIG. 7 is a top plan view of the first support of FIG. 6.

FIG. 8 is a cross-sectional view of the first support of FIG. 6 taken generally along line 8-8 of FIG. 6.

FIG. 18 is a top plan view of a second support of the air mattress assembly of FIG. 12.

FIG. 19 is a side elevational view of the second support of FIG. 18.

DETAILED DESCRIPTION

Figure 1:
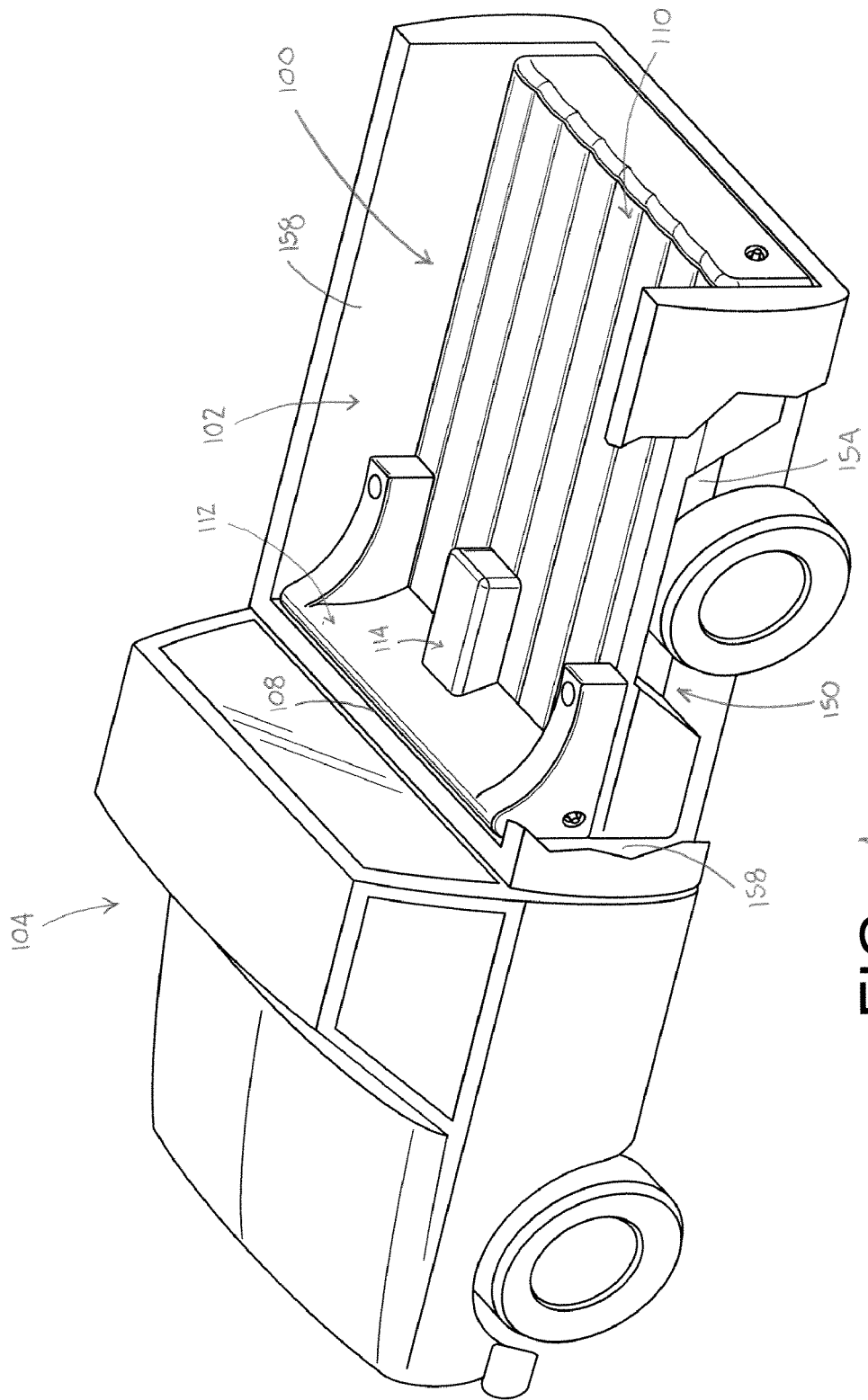
FIG. 1 is a perspective view, partially broken away of an air mattress assembly according to one aspect of the present disclosure positioned within a bed of a pickup truck.

It should, of course, be understood that the description and drawings herein are merely illustrative and that various modifications and changes can be made in the structures disclosed without departing from the present disclosure. It will also be appreciated that the various identified components of the air mattress assembly disclosed herein are merely terms of art that may vary from one manufacturer to another and should not be deemed to limit the present disclosure. Although the air mattress assembly is shown sized for a pickup truck bed, it should be appreciated that the air mattress assembly can be configured to accommodate any pickup-like vehicles (i.e., an El Camino), SUVs, vans, station wagons, mid-size or smaller vehicles. It should also be appreciated that the term air can include any conventional inflating substance. All references to direction and position, unless otherwise indicated, refer to the orientation of the air mattress assembly illustrated in the drawings and should not be construed as limiting the claims appended hereto.

Figure 2:
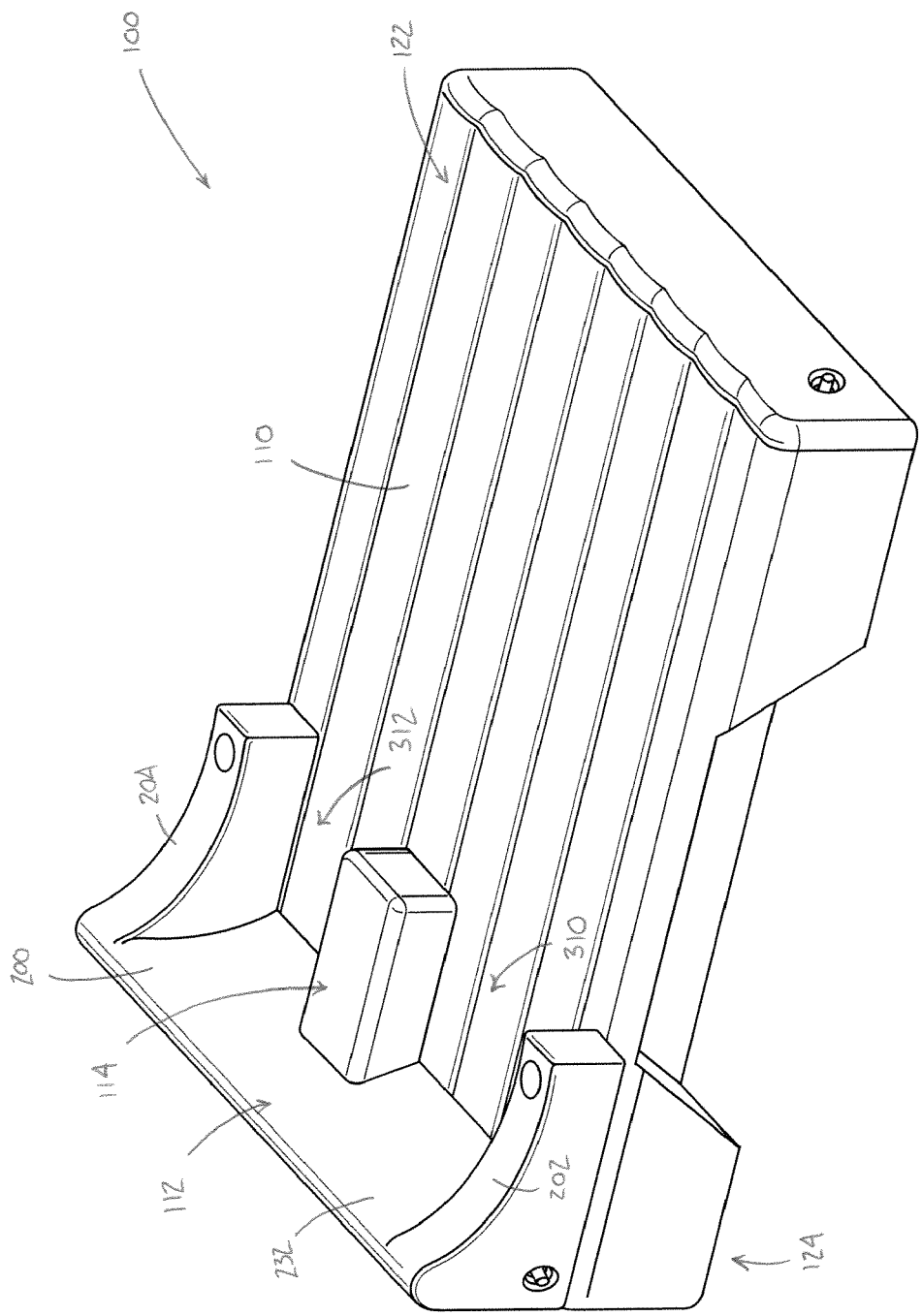
FIG. 2 is a perspective view of the air mattress assembly of FIG. 1.
Figure 3:
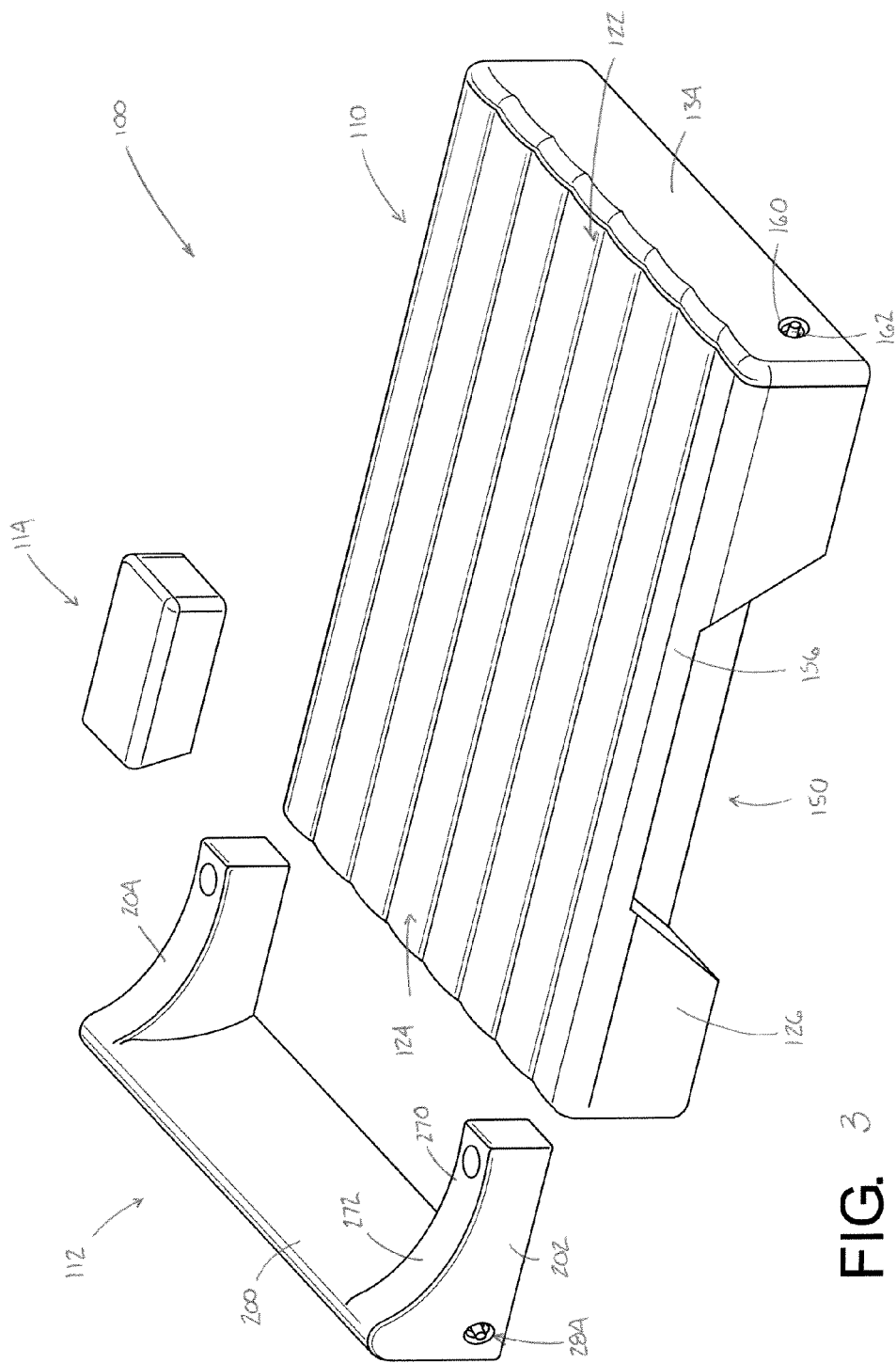
FIG. 3 is an exploded perspective view of the air mattress assembly of FIG. 1.

Referring now to FIGS. 1-3, wherein like numerals refer to like parts throughout the several views, an air mattress assembly 100 according to one aspect of the present disclosure is illustrated. The air mattress assembly described herein can be utilized for many different purposes, such as to accommodate sleeping in the back or bed of a vehicle or providing a comfortable place to sit during outdoor sporting events. As shown, the air mattress assembly 100 is a custom fit, inflatable unit which substantially overlies a bed 102 of a vehicle, such as the illustrated pickup truck 104. The air mattress assembly 100 generally comprises a base 110, a first support 112, and a second support 114. The first and second supports 112 and 114 are configured to be removably attached to the base 110.

Figure 4:
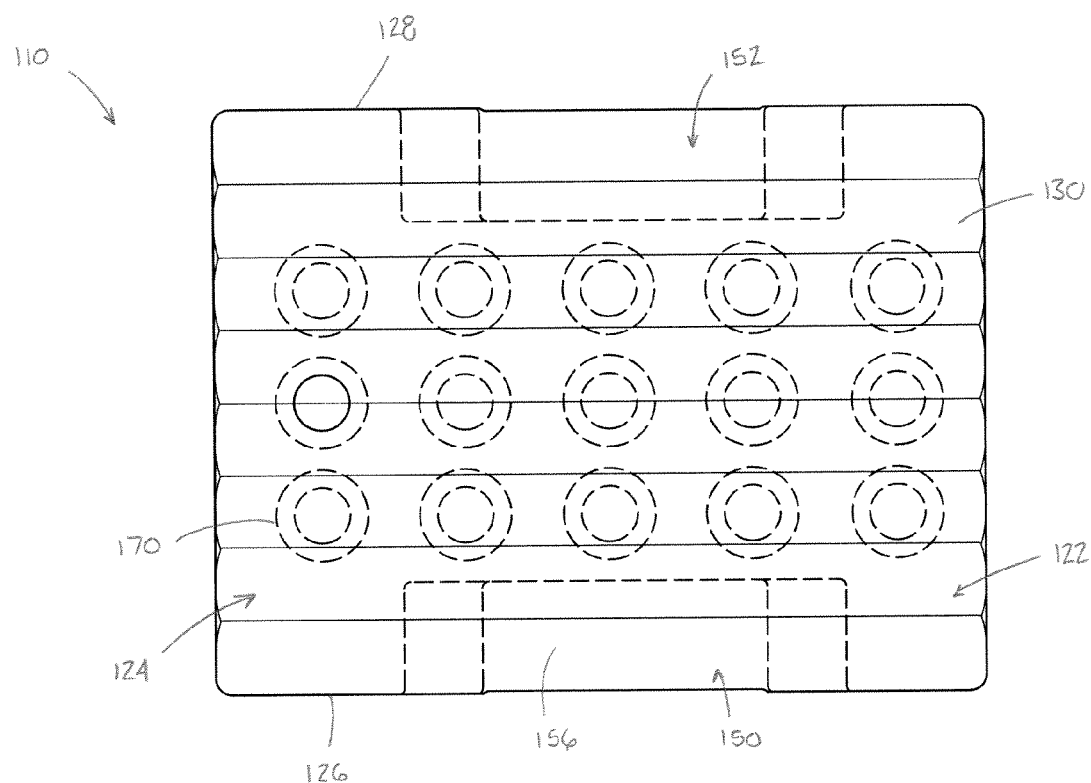
FIG. 4 is a top plan view of a base of the air mattress assembly of FIG. 1.
Figure 5:
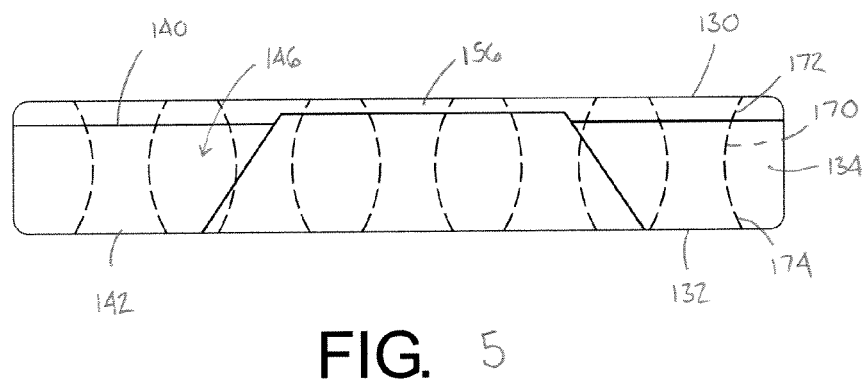
FIG. 5 is a side elevational view of the base of FIG. 4.

As shown in FIGS. 4 and 5, the base 110, which is in the form of a mattress, is substantially rectangular and has a rear portion 122, a front portion 124 and opposed side portions 126 and 128. The rear portion 122 is located nearest a tailgate (not shown) of the pickup 104, or a hatch or rear door of the vehicle. The front portion 124 is located adjacent to a headboard 108 of the pickup or front seats of the vehicle. Thus, the base has a length which allows substantially the entire space between the tailgate and headboard 108 of the bed 102, for example, to be available for sleeping. In the depicted embodiment, the base 110 has a unitary, single body construction and includes a top surface 130 and a bottom surface 132 connected to the top surface through a continuous vertical wall 134. In particular, the top surface 130 is connected to the vertical wall 134 throughout the upper periphery of the wall at an upper seal 140. Similarly, the bottom surface 132 is connected to the vertical wall 134 throughout the lower periphery of the wall at a lower seal 142. As a result, the top surface 130, bottom surface 132 and vertical wall 134 together form the outer structure of the base 110 and define an air chamber 146. The side edges 140, 142 of the vertical wall can be fused with the top and bottom surfaces using a conventional sealing process known to one of ordinary skill in the art. Further, user-selectable indicia may be imprinted on one of the top surface and the bottom surface.

The base side portions 126 and 128 include respective lateral recesses 150 and 152. Each recess 150, 152 is dimensioned to snugly conform around a wheel well compartment 154 located in the bed 102 of the pickup truck 104. This allows the base 110 to conform precisely to the vehicle bed for which it is intended to be used. As shown in FIG. 1, the lateral recesses 150, 152 do not extend completely from the top surface 130 to the bottom surface 132, but define a ledge 156 that sits atop the wheel well compartments 154. Therefore, the base 110 has a width which allows substantially the entire space between sidewalls 158 of the bed 102 to be available for sleeping, for example, instead of only the space between the wheel well compartments.

With reference to FIG. 3, for inflating the air chamber 146 of the base 110, an air port 160 can be provided on the rear portion 122 of the base. An air valve 162 selectively seals the air port 160. A cap (not shown) can be provided for covering the air valve, thus preventing accidental leakage of air through the air port and the air valve. As shown, the air port 160 and air valve 162 are located on the vertical wall 134 in order to facilitate easy inflation of the base 110; although, it should be understood that the air port and air valve may be located on any suitable portion of the base, depending upon the needs and desires of the user. The air valve 160 can be mounted within a recessed area (not shown) formed into the vertical wall 134 such that the air valve does not project laterally beyond the vertical wall. The air valve allows the selective passage of air in and out of the air chamber 146 and can be a standard safety valve or any other suitable, user-adjustable fluid valve commercially available and known to those of skill in the art. In the depicted embodiment, the air valve 162 is a one-way valve, or self-sealing valve, including a check valve which allows air flow into the air chamber 146 but must be pinched to allow air flow out of the chamber. For deflating, the air chamber 146 can be in fluid communication with a separate air outlet (not shown) which is connected to the vertical wall 134. The air outlet can have a wide opening for fast deflation.

With continued reference to FIGS. 4 and 5, a plurality of collapsible support columns 170 are disposed within the air chamber 146 of the base 110. Each column 170 has an upper end 172 and a lower end 174, with the upper end of each column being sealed to the top surface 130, and the lower end being sealed to the bottom surface 132. This sealing can also create an appearance of a two-piece construction, with a pillow section being disposed on the top surface. The columns 170 provide resilient support for the user, additional stability to the base 110 and equalize downward forces exerted thereon during sleeping conditions. Each column 170 can be cylindrically shaped. As depicted, the columns have one of a barrel-like and hour-glass conformation. The columns can be covered springs, air cylinders, inflatable cylinders, plastic coils or any other suitable deformable support. The columns 170 also serve as retention members which limit the outward expansion of the top and bottom surfaces 130, 132 as the air chamber 146 is being inflated with air. Alternatively, although columns are shown, other support/retention members are contemplated, such as I-beams, coil-like beams, tube-like beams and the like. Rings (not shown) may be formed where columns are sealed to the top and bottom surfaces, thus providing an alternative design or pattern in the outer surfaces 130, 132 of the base 110.

With reference now to FIGS. 6-8, the first support 112 is releasably secured to the front portion 124 of the base 110 and can extend the full width of the base. The first support includes a backrest 200 and first and second armrests 202 and 204, respectively. The first and second armrests 202, 204 extend from respective end section 210 and 214 of the backrest 200. The backrest and the armrests are integrally formed or connected together to form a single combined air chamber 220 so that air passes freely between the backrest and the armrests. The first support 112 is releasably connected to the base 110 through the use of conventional fasteners, such as zippers, snaps, hook and lock fasteners, clips, Velcro® and the like. Alternatively, the first support can be fixedly attached to the base 110 through use of high frequency welding or other conventional process.

The backrest 200 includes a back wall 230 and a front wall 232 which are connected to each other by a bottom wall 234 and a top wall 236. The back wall 230 extends substantially normal from the bottom wall and is supported by the headboard 108 of the bed 102 of the pickup truck 104 (see FIG. 1). The bottom wall 234 can be shaped to mate with the contour of the top surface 130 of the base 110. The top wall 236 can have an arcuate shape; although, this is not required. The front wall 232 can include a lumbar support section 240. As shown, the lumbar support section is at least partially defined by a convex portion 242 and a concave portion 244. The convex portion extends generally from the top wall 236 and the concave portion extends generally between the convex portion and the bottom wall 234. The lumbar support section 240 is configured to bring the lower back of the user naturally against the backrest 200.

As will also be understood and appreciated by those skilled in the art, the first and second armrests 202, 204 can be generally identical, except that they are axially mirrored relative to one another, and thus only the first armrest 202 will be described in further detail herein. In the illustrated embodiment, the first armrest 202 includes a top surface 260, a bottom surface 262, a front surface 264 and opposed side surfaces 266 and 268. The top surface includes a planar portion 270 and an arcuate portion 272 which connects the planar portion to one of the front wall 232 and top wall 236 of the backrest 200. The arcuate portion 272 extends a substantial length of the first armrest 202 thereby providing a gradual transition from the backrest 200 to the planar portion 270. A cup holder 280 can be located on the planar portion 270 adjacent to the front surface 264. In the depicted embodiment, the cup holder 280 is defined by a circular shaped recess 282. The top surface 260 can have a length about two-thirds the length of the first support 112; although, this is not required. The front surface 264 can have a height about equal to one-half the height of the backrest 200; although, this is not required. It will be appreciated that the above dimensions may vary widely within the scope of the present disclosure, depending in part upon the size of the desired air mattress assembly 100.

To inflate the first support 112, one of the backrest 200 and first and second armrests 202, 204 includes an inflation aperture or air valve 284 (FIG. 3). Similar to the air valve of the base 110, the air valve allows the selective passage of air in and out of the air chamber 220 and can be a standard safety valve or any other suitable, user-adjustable fluid valve commercially available and known to those of skill in the art.

Figure 9:
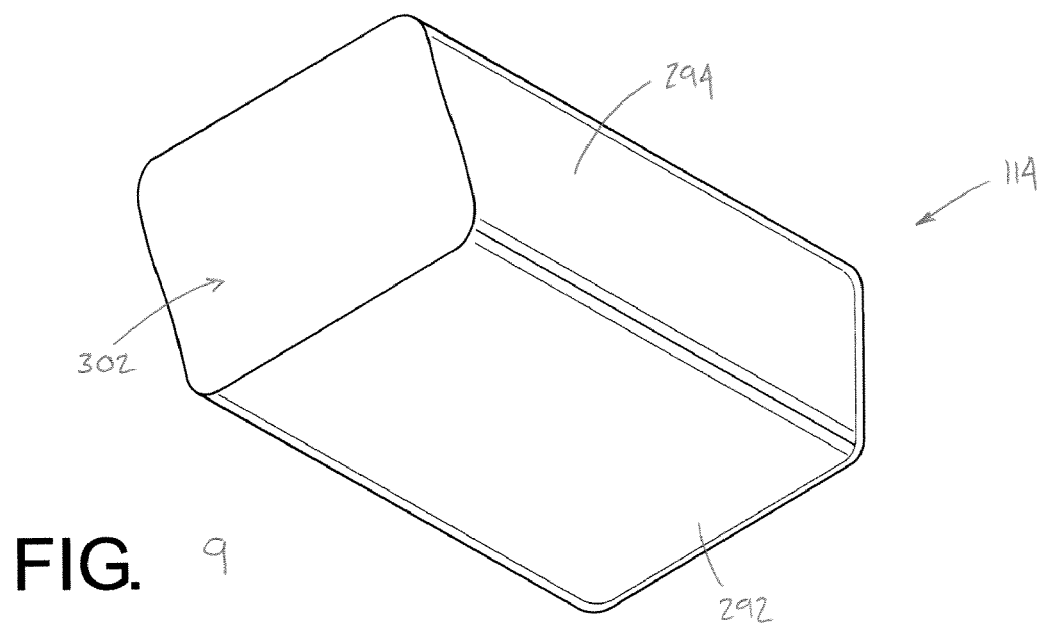
FIG. 9 is a perspective view of a second support of the air mattress assembly of FIG. 1.
Figure 10:
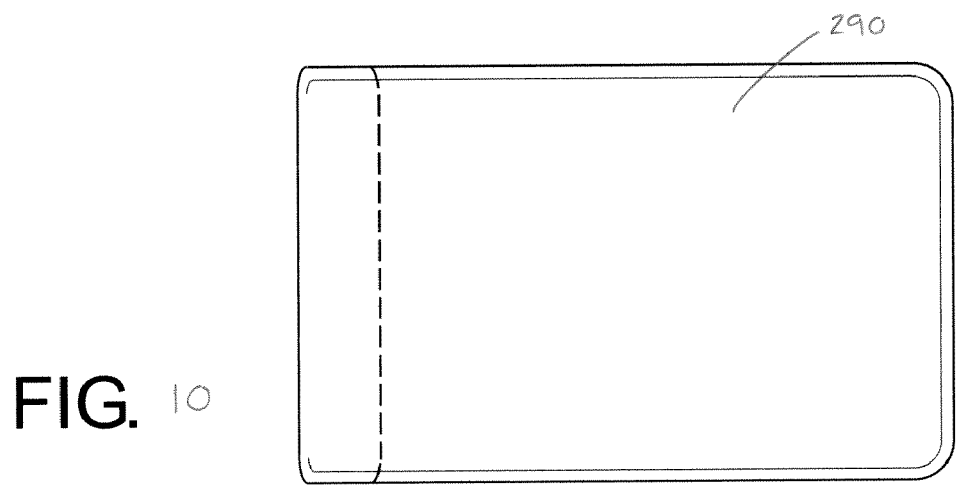
FIG. 10 is a top plan view of the second support of FIG. 9.
Figure 11:
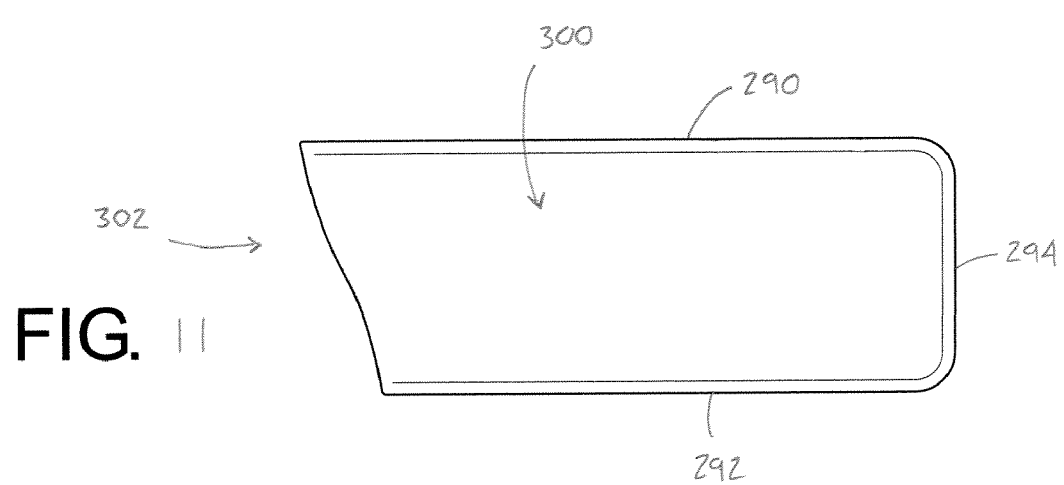
FIG. 11 is a side elevational view of the second support of FIG. 9.

With reference again to FIG. 2, the second support 114 is releasably secured to the front portion 124 of the base 110 adjacent to the front wall 232 of the first support 112. As shown in FIGS. 9-11, the second support, which can serve as an additional armrest for the user of the air mattress assembly 100, is substantially rectangular in shape and includes a top surface 290 and a bottom surface 292 connected to the top surface through a continuous vertical wall 294. The top surface 290, bottom surface 292 and vertical wall 294 together form the outer structure of the second support 114 and define and an air chamber 300. Similar to the base 110, the side edges of the vertical wall can be fused with the top and bottom surfaces using a conventional sealing process known to one of ordinary skill in the art. A rear section 302 of the vertical wall 294 is configured to mate with the contour of the front wall 232 of the backrest 200, particularly a portion of the lumbar support section 240. The second support 114 can have a width about equal to one-fourth the width of the first support 112, a length about equal to the length of the first and second armrests 202, 204, and a height substantially equal to the height of the armrest front surface 264. Again, it will be appreciated that the above dimensions may vary widely within the scope of the present disclosure, depending in part upon the size of the desired air mattress assembly 100.

The second support 114 is releasably connected to one of the first support 112 and the base 110 through the use of conventional fasteners, such as zippers, snaps, hook and lock fasteners, clips, Velcro® and the like. Alternatively, the second support can be fixedly attached to the base 110 through use of high frequency welding or other conventional process. The second support 114 can be selectively positioned along the width of the first support 112 such that first and second separated seating areas 310, 312 (see FIG. 2) having varying widths can be defined by the first and second supports 112, 114. The second support can include a cup holder (see FIG. 12) similar to the cup holder 280 of the armrest 202.

To inflate the second support 114, the vertical wall 294 can include an inflation aperture or air valve (not shown). Again, the air valve allows the selective passage of air in and out of the air chamber 300 and can be a standard safety valve or any other suitable, user-adjustable fluid valve commercially available and known to those of skill in the art.

The components of the air mattress assembly 100 can be selectively inflated via an air pump (not shown). The air pump may be any conventional portable air pump and may be powered by the vehicle's battery, a separate portable battery, a standard outdoor 110-volt or 220-volt ac power supply, such as are often found in camping grounds and trailer parks, or by any other suitable power source, including any standard indoor or outdoor AC or DC electrical sources. A cavity (not shown) can be formed on the base 110, the cavity being sized and shaped to receive the air pump. The air pump can be fixed within the cavity, or can be removable, allowing for separate storage and transport.

The components of the air mattress assembly 100 can be made from a conventional vinyl material, rubber material or other suitable, pliable, durable plastic. The thickness of the base 110 may vary according to the vehicle for which it is intended to be used with and based upon the desired amount of cushioning and support that the base is to demonstrate. The other dimensions of the custom fit air mattress assembly 100 will depend upon the make and model of vehicle with which it is to be used with because these dimensions vary from vehicle to vehicle. While the base 110 and second support 114 of the air mattress assembly 100 has been referred to as having a substantially rectangular shape, it should be noted that the base 110 and second support 114 may have another desired shape, dependent upon the structure that the air mattress assembly is to be used with, so long as the air mattress assembly 100 is custom fit to be snugly received within the desired area of the vehicle, and in the case of the pickup 104, with the bed 102 and over the protruding wheel well compartments 154.

The components of the air mattress assembly 100 have been described as each component defining a separate air chamber. It should also be appreciated that the respective air chambers 146, 220 and 300 of the base 110, first support 112 and second support 114 can be in fluid communication with each other. In that instance, the air mattress assembly 100 would be a unitary one-piece inflatable assembly having a single air valve for inflating each air chamber.

Figure 12:
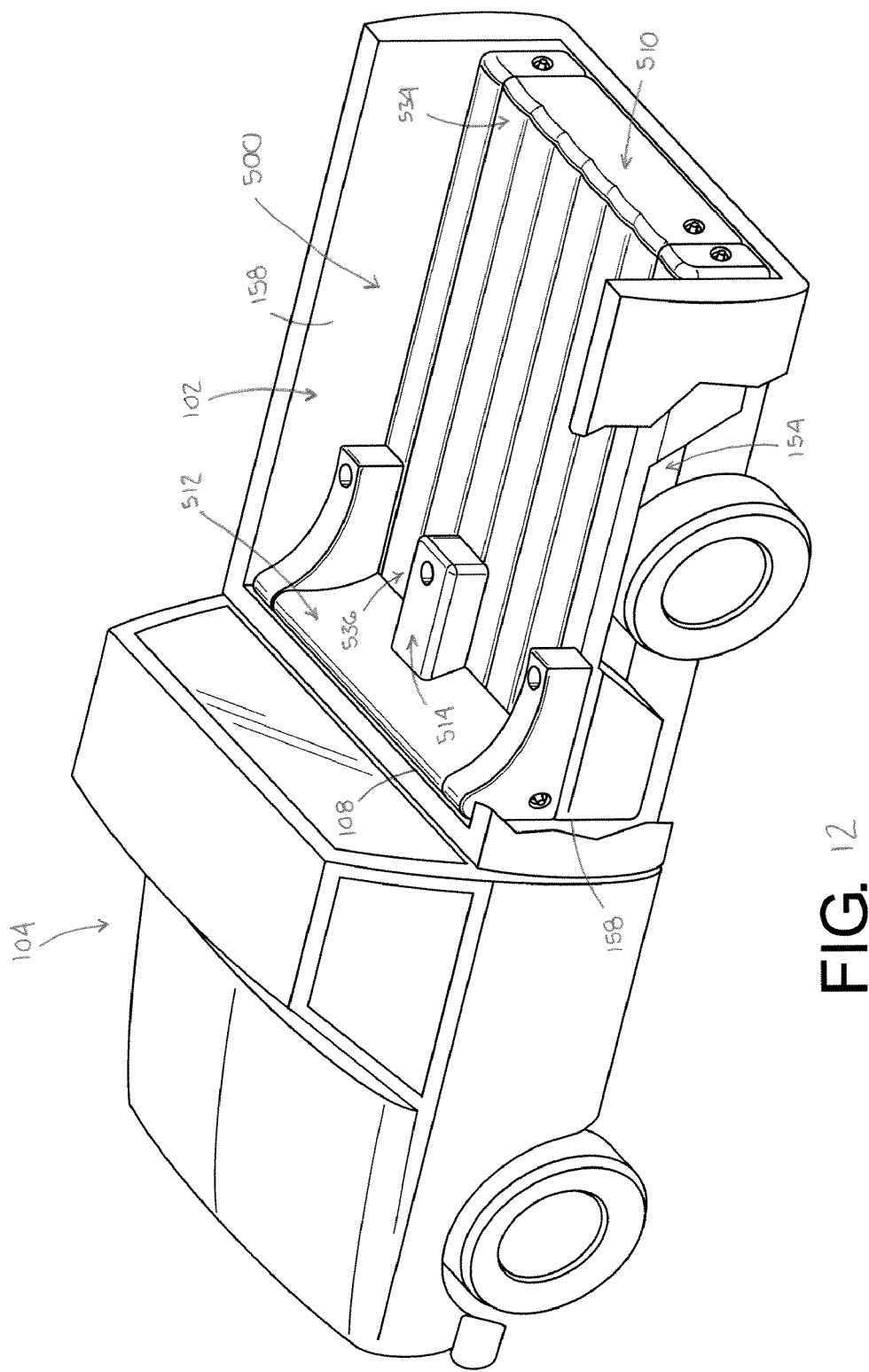
FIG. 12 is a perspective view, partially broken away of an air mattress assembly according to another aspect of the present disclosure positioned within a bed of a pickup truck.
Figure 13:
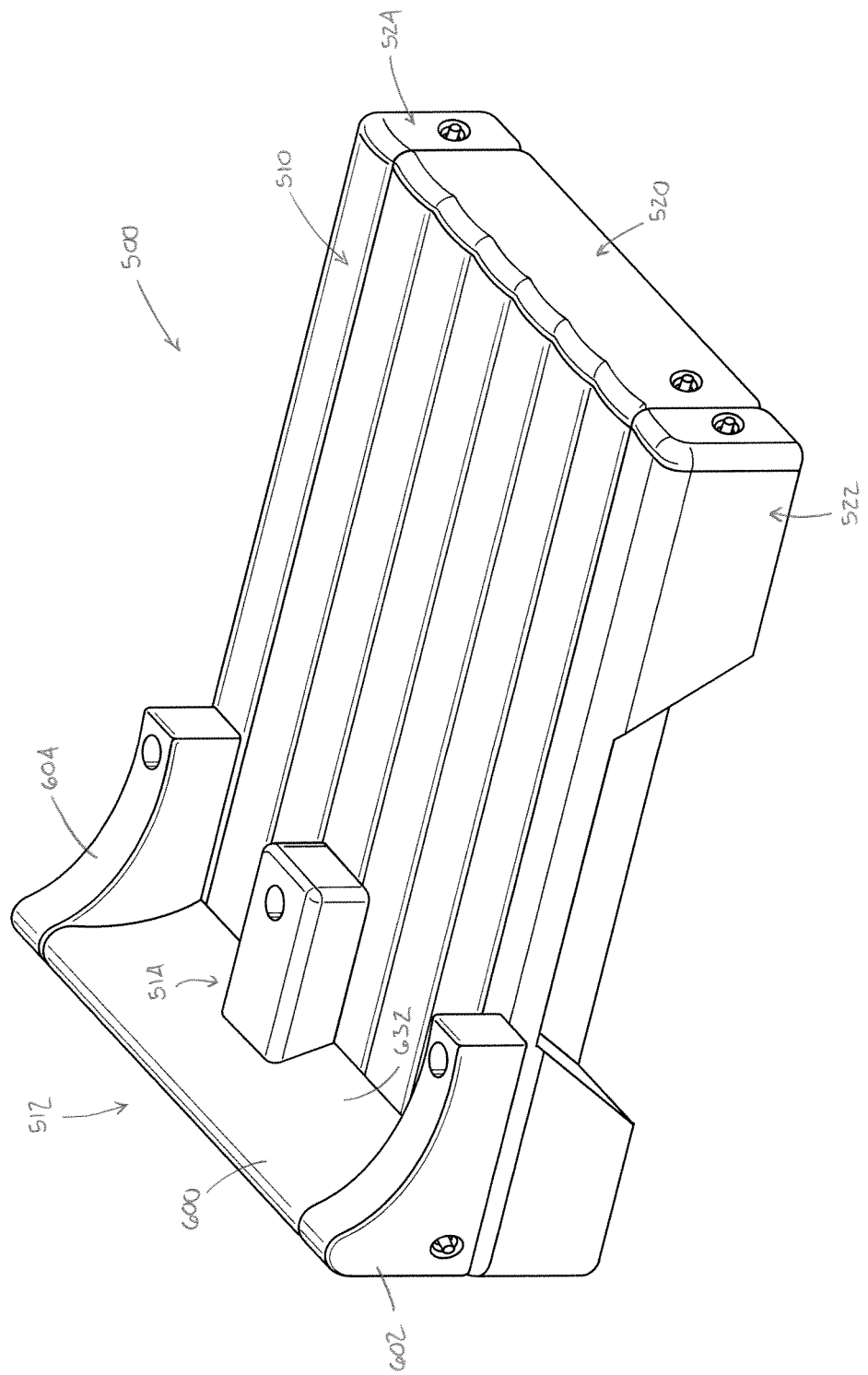
FIG. 13 is a perspective view of the air mattress assembly of FIG. 12.
Figure 14:
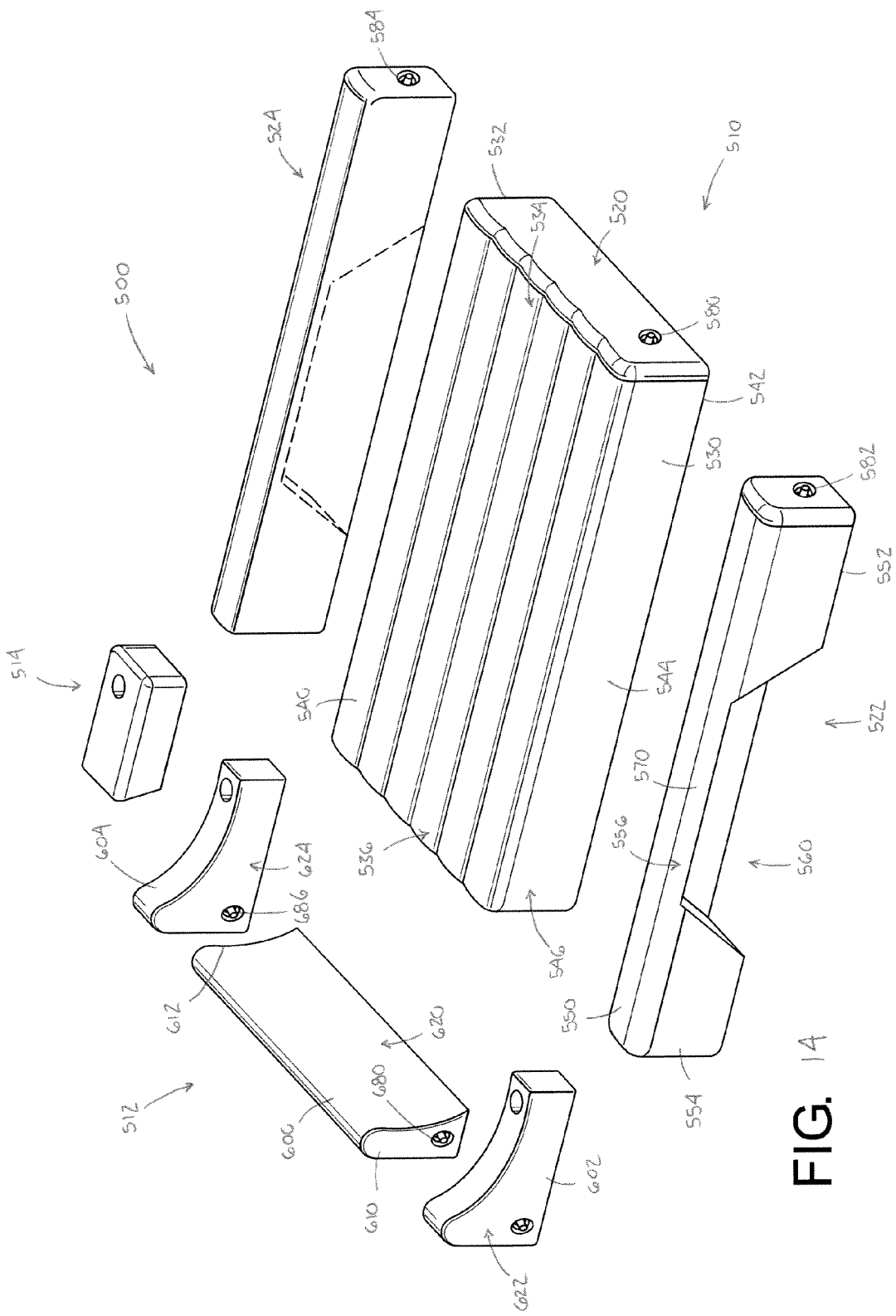
FIG. 14 is an exploded perspective view of the air mattress assembly of FIG. 12.

With reference now to FIGS. 12-14, an air mattress assembly 500 according to another aspect of the present disclosure is illustrated. Similar to air mattress assembly 100, air mattress assembly 500 is a custom fit, inflatable unit which substantially overlies the bed 102 of the illustrated pickup truck 104 (see FIG. 1). The air mattress assembly 500 generally comprises a base 510, a first support 512, and a second support 514, the first and second supports being configured to be removably attached to the base.

As shown in FIGS. 13 and 14, the base 510 includes a first inflatable member 520, which is in the form of a mattress, and second and third inflatable members 522 and 524, respectively, which are selectively attached to opposed side portions 530 and 532 of the first member 520. The first member is substantially rectangular in shape and has a rear portion 534, which is located nearest the tailgate of the pickup 104, and a front portion 536, which is located adjacent to the headboard 108 of the pickup. The side portions are located adjacent the wheel well compartment 154 located in the bed 102 of the pickup 104. Thus, the first member has a length and width which allows substantially the entire space between the tailgate and headboard 108 and wheel well compartments 154 of the bed 102, for example, to be available for sleeping. In the depicted embodiment, the first member 520 has a unitary, single body construction and includes a top surface 540 and a bottom surface 542 connected to the top surface through a continuous vertical wall 544. The top surface, bottom surface and vertical wall together define an air chamber 546.

As will also be understood and appreciated by those skilled in the art, the second and third inflatable members 522 and 524 can be generally identical, except that they are axially mirrored relative to one another. By having the second and third members 522 and 524 being generally identical, the cost of manufacturing the base 510 is significantly reduced (e.g., only a single mold is required to manufacture the second and third members). Further, by having a multiple member base 510, a consumer can replace one of the members of the base if that member is damaged without having to replace the entire base 510 (as compared to replacing the unitary base 110). Thus, the multiple member base provides cost savings to the consumer.

Only the second member 522 will be described in further detail herein. In the illustrated embodiment, the second member includes a top surface 550 and a bottom surface 552 connected to the top surface through a continuous vertical wall 554. The top surface, bottom surface and vertical wall together define an air chamber 556. The second member 522 has a length approximately equal to the length of the first support 520 and width approximately equal to a width of the wheel well compartment 154. As shown, the second member 522 includes a lateral recess 560 that is dimensioned to snugly conform around the wheel well compartment 154. As shown in FIG. 14, the lateral recess 560 does not extend completely from the top surface 552 to the bottom surface 552, but defines a respective ledge 570 that sits atop the wheel well compartments 154. The second inflatable member 522 is releasably connected to the first member 520 through the use of conventional fasteners, such as zippers, snaps, hook and loop fasteners, clips, Velcro® and the like. With the second and third members 522 and 524 selectively attached to the opposed side portions 530 and 532 of the first member 520, the base 110 can have a width which allows substantially the entire space between sidewalls 158 of the bed 102 to be available instead of only the space between the wheel well compartments.

To inflate the first member 520, second member 522 and third member 524, each member includes a respective inflation aperture or air valve 580, 582, 584. Similar to the air valve of the base 110, the air valve allows the selective passage of air in and out of the respective air chamber of each member and can be a standard safety valve or any other suitable, user-adjustable fluid valve commercially available and known to those of skill in the art.

Figure 15:
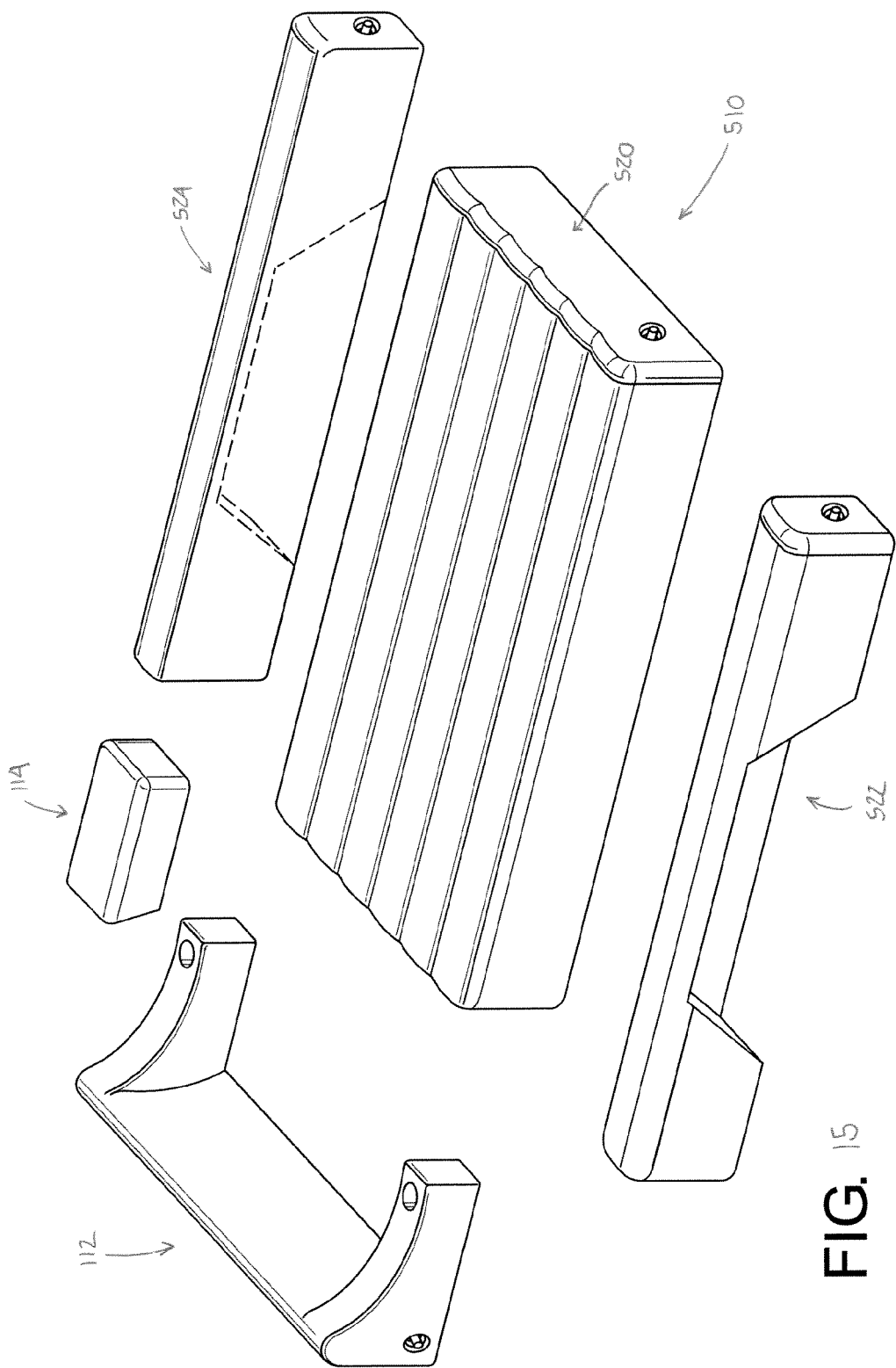
FIG. 15 is an exploded perspective view of the first and second supports of the air mattress assembly of FIG. 1 and a base of the air mattress assembly of FIG. 12.

With continued reference to FIGS. 13 and 14, the first support 512 is releasably secured to the base 510 and can extend the full width of the base. The first support includes a backrest 600 and first and second armrests 602 and 604, respectively. The first and second armrests 602, 604 extend from respective end section 610 and 614 of the backrest 600. In this embodiment, the backrest 600 and the first and second armrests 602 and 604 are separate members, each defining a separate air chamber 620, 622 and 624, respectively. Alternatively, as shown in FIG. 15, the first support 112 can be used with the base 510.

Figure 16:
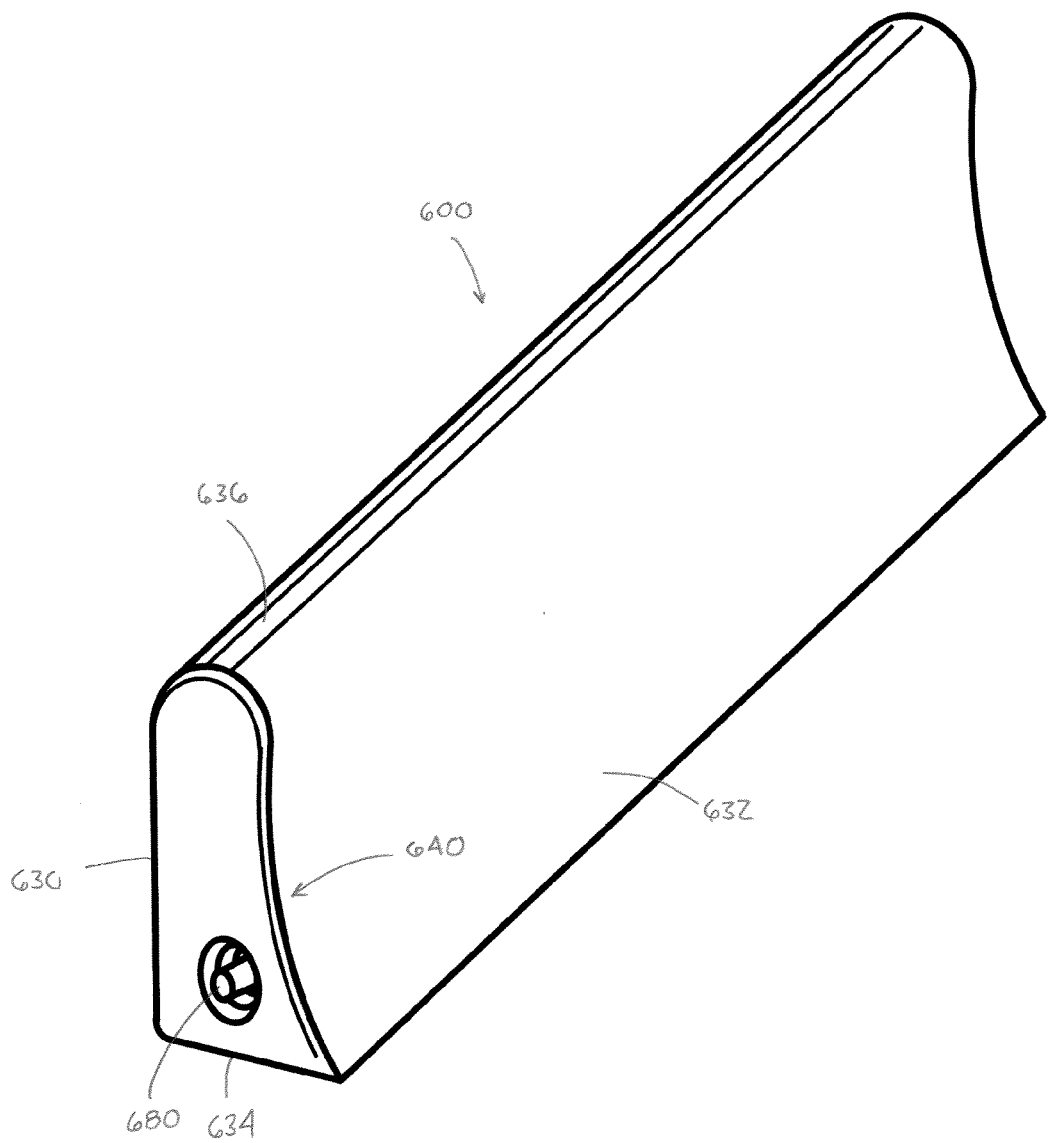
FIG. 16 is a perspective view of a backrest of a first support of the air mattress assembly of FIG. 12.

As shown in FIG. 16, the backrest 600 includes a back wall 630 and a front wall 632 which are connected to each other by a bottom wall 634 and a top wall 636. The back wall 630 extends substantially normal from the bottom wall and is supported by the headboard 108 of the bed 102 of the pickup truck 104. The bottom wall 634 can be shaped to mate with the contour of the top surface of the base 510. The front wall 232 can include a lumbar support section 640, which is similar to lumbar support section 240.

As will also be understood and appreciated by those skilled in the art, the first and second armrests 602, 604 can be generally identical, except that they are axially mirrored relative to one another. As indicated previously with respect to the multiple member base 510, by having the first and second armrests 602, 604 being generally identical, the cost of manufacturing the first support 512 is also significantly reduced (e.g., only a single mold is required to manufacture the first and second armrests). Further, a consumer can easily replace an armrest if that armrest is damaged without having to replace the entire first support 512 (as compared to replacing the unitary first support 112). Again, this provides cost savings to the consumer.

Figure 17:
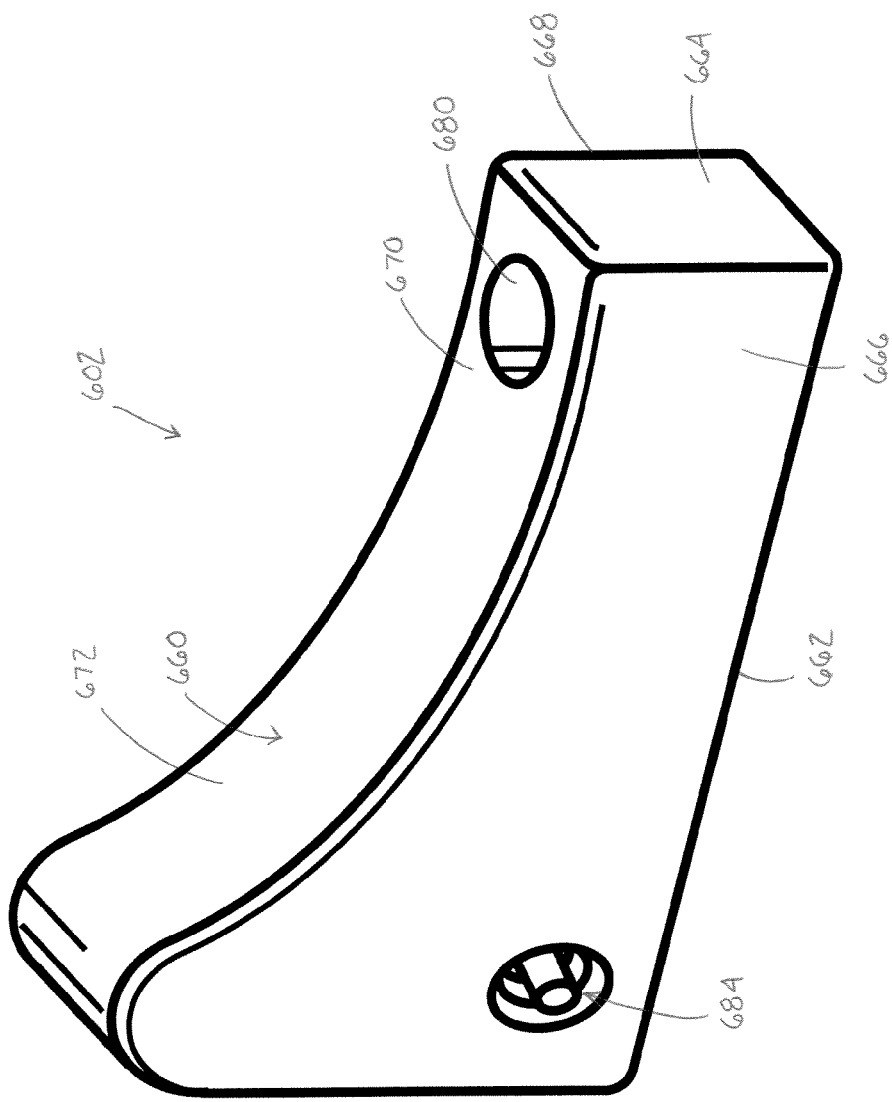
FIG. 17 is a perspective view of an armrest of the first support of the air mattress assembly of FIG. 12.

Only the first armrest 602 will be described in further detail herein. In the illustrated embodiment of FIG. 17, the first armrest 602 includes a top surface 660, a bottom surface 662, a front surface 664 and opposed side surfaces 666 and 668. The top surface includes a planar portion 670 and an arcuate portion 672 which connects the planar portion to one of the front wall 632 and top wall 636 of the backrest 600. A cup holder 680 can be located on the armrest adjacent to the front wall.

To inflate the backrest 600 and first and second armrests 602 and 604, each component includes an inflation aperture or air valve 682, 684 and 686. The air valve allows the selective passage of air in and out of the respective air chamber of each member and can be a standard safety valve or any other suitable, user-adjustable fluid valve commercially available and known to those of skill in the art.

The backrest 600 is releasably connected to the base 510 through the use of conventional fasteners. The first and second armrests 602, 604 are releasably connected to at least one of the backrest and base through the use of conventional fasteners. Alternatively, the first and second armrests can be fixedly attached to the backrest through use of high frequency welding or other conventional process.

With continued reference to FIG. 13, and additional reference to FIGS. 18 and 19, the second support 514, which is similar to second support 114, is releasably secured to the base 510 adjacent to the front wall 632 of the first support 512. The second support, which can serve as an additional armrest for the user of the air mattress assembly 500, includes a top surface 690 and a bottom surface 692 connected to the top surface through a continuous vertical wall 694. The second support 114 is releasably connected to one of the first support 512 and the base 510 through the use of conventional fasteners. To inflate the second support 514, the vertical wall 694 can include an inflation aperture or air valve 698. Again, the air valve allows the selective passage of air in and out of an air chamber 700 defined by the second support and can be a standard safety valve or any other suitable, user-adjustable fluid valve commercially available and known to those of skill in the art.

Figure 20:
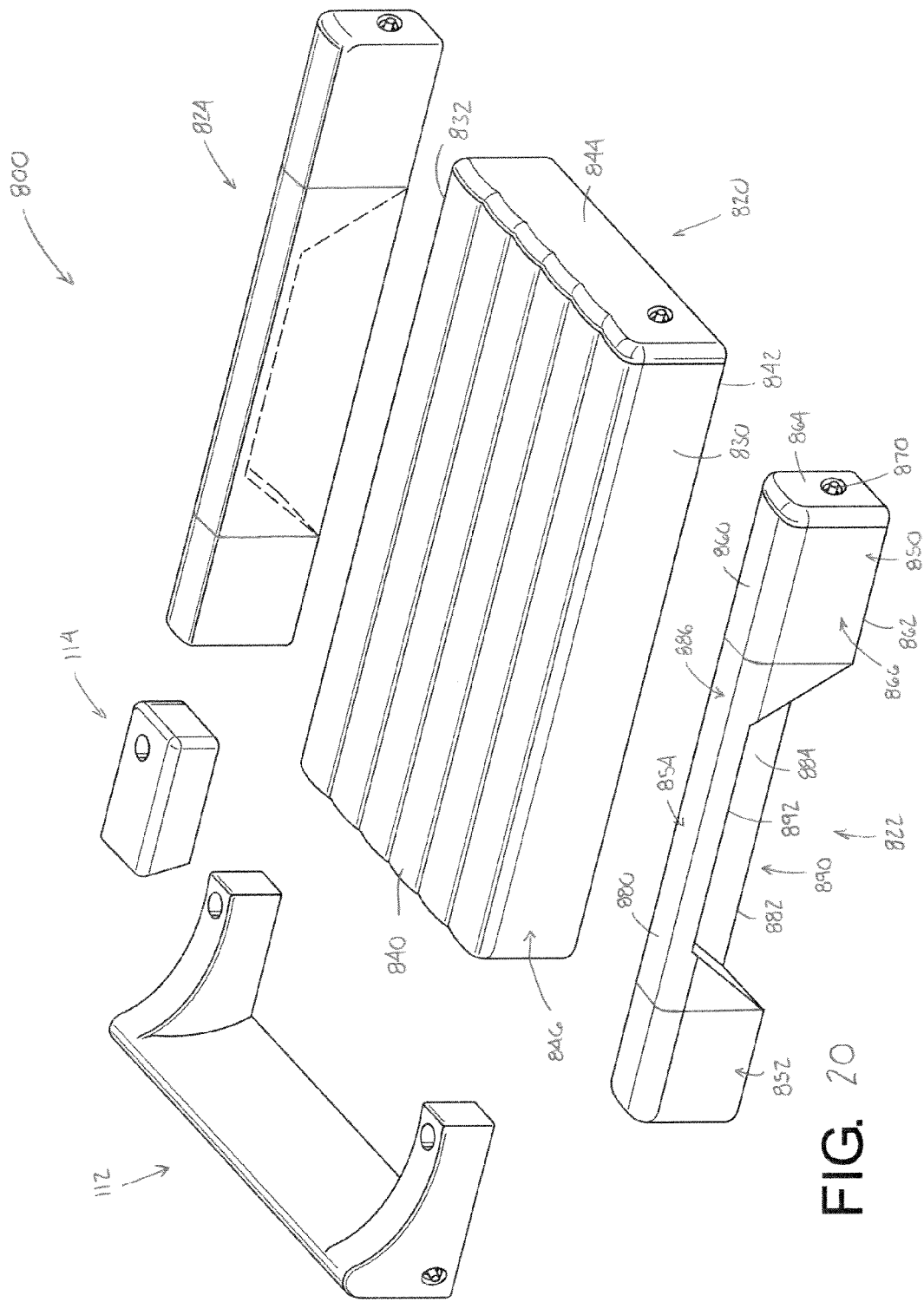
FIG. 20 is an exploded perspective view of an air mattress assembly according to yet another aspect of the present disclosure.

With reference now to FIG. 20, an air mattress assembly 800 according to yet another aspect of the present disclosure is illustrated. Similar to air mattress assembly 500, air mattress assembly 800 is a custom fit, inflatable unit which substantially overlies the bed 102 of the illustrated pickup truck 104 (see FIG. 1). The air mattress assembly 800 generally comprises a base 810, the first support 112, and the second support 114, the first and second supports being configured to be removably attached to the base.

Similar to base 510, base 810 includes a first inflatable member 820, which is in the form of a mattress, and second and third inflatable members 822 and 824, respectively, which are selectively attached to opposed side portions 830 and 832 of the first member 820. In the depicted embodiment, the first member 820 has a unitary, single body construction and includes a top surface 840 and a bottom surface 842 connected to the top surface through a continuous vertical wall 844. The top surface, bottom surface and vertical wall together define an air chamber 846. The first member 820 is substantially identical to first member 520 so that further discussion herein is deemed unnecessary.

The second and third members 822 and 824 have a length approximately equal to the length of the first member 820 and width approximately equal to a width of the wheel well compartment 154. The second and third members are releasably connected to the first member 820 through the use of conventional fasteners, such as zippers, snaps, hook and lock fasteners, clips, Velcro® and the like. With the second and third members 822 and 824 selectively attached to the opposed side portions 830 and 832 of the first member 820, the base 810 can have a width which allows substantially the entire space between sidewalls 158 of the bed 102 to be available instead of only the space between the wheel well compartments.

As will also be understood and appreciated by those skilled in the art, the second and third inflatable members 822 and 824 can be generally identical, except that they are axially mirrored relative to one another. Again, this can reduce the costs of manufacturing. Only the second member 822 will be described in further detail herein. In the illustrated embodiment, the second member is a multiple component member that can include first and second end components 850 and 852, respectively, and a center, wheel well component 854. In the illustrated embodiment, the first and second end components and center components are separate, inflatable components. Each end component 850 and 852 is releasably connected to an end section of the center component 854 through the use of conventional fasteners, such as zippers, snaps, hook and lock fasteners, clips, Velcro® and the like. Alternatively, it should be appreciated that one of the first and second end components can be integrally connected to the center component.

As shown in FIG. 20, the first end component includes a top surface 860 and a bottom surface 862 connected to the top surface through a continuous wall 864. The top surface, bottom surface and vertical wall together define an air chamber 866. To inflate the first end component, an inflation aperture or air valve 870 is provided. As will be appreciated, depending on the length of the truck bed 102, the first and second end components 850, 852 can be generally identical. Thus, further discussion of the second component 852 is deemed unnecessary.

The center component includes a top surface 880 and a bottom surface 882 connected to the top surface through a continuous vertical wall 884. The top surface, bottom surface and vertical wall together define an air chamber 886. As shown, the center component includes a lateral recess 890 that is dimensioned to snugly conform around the wheel well compartment 154. As shown in FIG. 20, the lateral recess 890 does not extend completely from the top surface 880 to the bottom surface 882, but defines a respective ledge 892 that sits atop the wheel well compartments 154. To inflate the center component, an inflation aperture or air valve (not visible) 870 is provided.

By having generally identical first and second end components 850 and 852, the cost to manufacture the second member 822 is significantly reduced (e.g., only a single mold is required to manufacture the first and second end components). Further, first and second end components of varying lengths can be manufactured. For example, the first end component 850 can have one of a first length and a second length and the second end component 852 can have one of the first length and the second length. This allows for use of a common length center component 854 regardless of the length of the truck bed. Further because the second and third members 822 and 824 are generally identical, the cost of manufacturing the base 810 is significantly reduced. Again, by having a multiple member base 810, a consumer can replace one of the base members without having to replace the entire base 810.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An inflatable air mattress assembly for use with a vehicle including a bed having protruding wheel well compartments, opposed sidewalls, a tailgate and a headboard, the air mattress assembly comprising:

an inflatable base including a top surface and a bottom surface, the base having lateral recesses formed therein which extend from the bottom surface towards the top surface and define a ledge over the recesses, wherein the base is dimensioned and configured for placement in a vehicle bed with the recesses being disposed over wheel well compartments protruding into the bed, a front portion of the base being adjacent a headboard, a rear portion of the base being adjacent a tailgate, wherein the base member includes a first member and a second member releasably connected to the first member, the second member including one of the lateral recesses;

an inflatable first support releasable attached to the front portion of the base, the first support including an inflatable backrest and at least one inflatable armrest connected to the backrest; and an inflatable second support releasably attached to one of the front portion of the base and the first support, the second support being spaced from the at least one armrest.

2. The air mattress assembly of claim 1, further comprising a plurality of collapsible support columns disposed within the base, each of the columns extending between the top surface and bottom surface of the base, the collapsible columns having a substantially hour-glass configuration.

3. The air mattress assembly of claim 1, wherein the first support includes a first armrest and a second armrest, the first and second armrests extending from respective first and second end sections of the backrest.

4. The air mattress assembly of claim 3, wherein at least one of the first and second armrests includes a cup holder.

5. The air mattress assembly of claim 1, wherein the second support is configured to be selectively positioned along a width of the first support such that first and second separated seating areas having varying widths can be defined by the first and second supports.

6. The air mattress assembly of claim 1, wherein the second member includes a first inflatable component and a separate second inflatable component releasably connected to the first component, wherein at least one of the first and second components includes the lateral recess.

7. The air mattress assembly of claim 1, wherein the second member includes first, second and third separate inflatable components, the first and second components being releasably connected to respective end sections of the third component, wherein the third component includes a lateral recess.

8. The air mattress assembly of claim 1, wherein the backrest includes a back wall and a front wall, the back wall being supported by the headboard, the front wall including a lumbar support section.

9. The air mattress assembly of claim 1, wherein the backrest and the at least one armrest are integrally connected and together define an air chamber, wherein air passes freely between the backrest and the at least one armrest.

10. The air mattress assembly of claim 1, wherein the at least one armrest includes a top surface having a planar portion and an arcuate portion which connects the planar portion to the backrest, the arcuate portion extending a substantial length of the at least one armrest thereby providing a gradual transition from the backrest to the planar portion.

11. The air mattress assembly of claim 1, wherein the at least one armrest includes a length and a height and the second support includes a length and a height, wherein the length of the second support is about equal to the length of the at least one armrest, wherein the height of the second support is about equal to the height of the at least one armrest, the second support providing an additional armrest for the user of the air mattress assembly.

12. A custom fit inflatable air mattress assembly for use with a pickup including a bed having protruding wheel well compartments, opposed sidewalls, a tailgate and a headboard, the air mattress assembly comprising:

an inflatable base dimensioned and configured for placement in a pickup bed, the base covering the entire bed including wheel well compartments, the base including a first member and a second member releasably connected to the first member, at least one of the first and second members being formed from a first inflatable component and a second inflatable component, wherein one of the first and second components has a lateral recess formed therein, the recess being disposed over a wheel well compartment protruding into the bed, wherein the base includes a third member releasably connected to one of the first and second members, the third member having a lateral recess formed therein, wherein the recess is disposed over a wheel well compartment protruding into the bed;

an inflatable first support removably attached to the front portion of the base, the first support including an inflatable backrest and first and second inflatable armrests, at least one of the first and second armrests including a cup holder; and an inflatable second support removably attached to one of the first support and the base, the second support providing an additional armrest.

13. A custom fit inflatable air mattress assembly for use with a pickup including a bed having protruding wheel well compartments, opposed sidewalls, a tailgate and a headboard, the air mattress assembly comprising:

an inflatable base configured for placement in a pickup bed, the base covering substantially the entire bed including wheel well compartments, wherein the base includes a first member having first and second side portions, and a second member releasably connected to one of the side portions of the first member, the second member having a lateral recess formed therein which extends from a bottom surface towards a top surface and defines a ledge over the recess, wherein the recess is disposed over a wheel well compartment protruding into the bed;

an inflatable first support removably attached to the front portion of the base, the first support having a width approximately equal to the width of the base, the first support including an inflatable backrest and first and second inflatable armrests, at least one of the first and second armrests including a cup holder; and an inflatable second support removably attached to one of the first support and the base, the second support being positionable along the width of the first support and serves as an additional armrest.

14. The air mattress assembly of claim 13, wherein each of the first and second armrests includes a cup holder.

15. The air mattress assembly of claim 13, wherein the second member is formed of a first inflatable component and a second inflatable component releasable connected to the first component, wherein at least one of the first and second components includes the lateral recess.

16. The air mattress assembly of claim 15, wherein the base includes a third member releasably connected the other side portion of the first member, the third member having a lateral recess formed therein which extends from a bottom surface towards a top surface and defines a ledge over the recess, wherein the recess is disposed over a wheel well compartment protruding into the bed.

17. The air mattress assembly of claim 16, wherein the third member is formed of a first inflatable component and a second inflatable component releasable (sp.) connected to the first component, wherein at least one of the first and second components includes the lateral recess.

* * * * *